United States Patent
Grant

(10) Patent No.: US 9,809,188 B1
(45) Date of Patent: Nov. 7, 2017

(54) CABIN COVER SYSTEM FOR MACHINE

(71) Applicant: Caterpillar Inc., Peoria, IL (US)

(72) Inventor: Marion B. Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/238,825

(22) Filed: Aug. 17, 2016

(51) Int. Cl.
  *B60R 21/11* (2006.01)
  *E02F 9/16* (2006.01)

(52) U.S. Cl.
  CPC .............. *B60R 21/11* (2013.01); *E02F 9/163* (2013.01)

(58) Field of Classification Search
  CPC ................................. B60R 21/11; E02F 9/163
  USPC ............ 296/190.03; 298/1 R, 17 R; 414/914
  See application file for complete search history.

(56) References Cited

U.S. PATENT DOCUMENTS

| 3,833,255 | A | 9/1974 | Logue |
| 4,116,486 | A | 9/1978 | Duttarer |
| 4,425,002 | A | 1/1984 | Coleman et al. |
| 5,520,442 | A * | 5/1996 | Kisami ................... B60R 19/00 280/748 |
| 5,797,657 | A | 8/1998 | D'Amico et al. |

FOREIGN PATENT DOCUMENTS

| GB | 2507405 | 4/2014 |
| WO | 2013050885 | 4/2013 |

* cited by examiner

*Primary Examiner* — Jason S Morrow
(74) *Attorney, Agent, or Firm* — William R. Tinker

(57) ABSTRACT

The disclosure relates to a cabin cover system positioned over the operator cabin of a machine. The cabin cover system comprises a first support member extending vertically from a frame member. The first support member has a first portion attached to the frame member and a second portion spaced apart from the first portion. The cabin cover system further includes a canopy pivotally coupled to the second portion of the first support member. The cabin cover system also includes at least one hydraulic actuator operatively coupled to each of the canopy and the frame member. The at least one hydraulic actuator is configured to pivotally move the canopy towards the truck body.

17 Claims, 3 Drawing Sheets

CABIN COVER SYSTEM FOR MACHINE

TECHNICAL FIELD

The present disclosure relates to truck bodies of machines and, more particularly to a cabin cover system for a truck body of a machine.

BACKGROUND

Machines, such as trucks, include a truck body and an operator cabin carried by a machine frame. The truck body is disposed behind the operator cabin of the machines. Generally, the truck body includes a material carriage for carrying a payload of the material. The truck body also includes a large flat canopy extending over the operator cabin of the machine to provide protection to an operator and an operator cabin area from any damage due to an overflow of material from the material carriage. The canopy is cantilevered out from the material carriage. Generally, a hydraulics system is disposed in the machine to operate the truck body to load and unload the material from the truck body. The presence of a cantilevered large dead mass of the canopy limits a tonnage that the truck can carry and performance of the hydraulic system associated with the truck body.

W O Patent Publication Number 2013050885 discloses a structure to protect a cabin of a vehicle. The structure comprises a lower connection portion for connecting the frame of the vehicle, by means of a connection plate or connection flange and of a counterframe to be reversibly mounted to the frame. The structure also includes an upright that in use extends vertically from the connection portion behind the cabin, at an angle with respect to the cabin. The structure further includes a cover means for covering the cabin. The cover means extends from the upright to form a plane shield above the cabin. The cover means comprise a continuous shield, or a plurality of linear elements stiffened by a frame. The cover means can be moved with respect to the lower connection portion, between a use position, at which it is arranged above the cabin, and a maintenance position, at which it does not hinder the forward rotation of the cabin and/or the access of an operator between the cabin and the upright.

SUMMARY OF THE DISCLOSURE

In one aspect of the present disclosure a machine is provided. The machine includes a frame member. The machine further includes a truck body disposed on the frame member. The machine also includes an operator cabin disposed on the frame member adjacent to the truck body. The machine includes a cabin cover system positioned over the operator cabin. The cabin cover system includes a first support member extending vertically from the frame member. The first support member has a first portion attached to the frame member and a second portion spaced apart from the first portion. The cabin cover system further includes a canopy pivotally coupled to the second portion of the first support member. The cabin cover system also includes at least one hydraulic actuator operatively coupled to each of the canopy and the frame member. The at least one hydraulic actuator is configured to pivotally move the canopy towards the truck body.

In another aspect of the present disclosure, a truck body for a machine is provided. The truck body includes a material carriage pivotally coupled on a frame member of the machine. The truck body also includes a cabin cover system positioned over an operator cabin of the machine. The cabin cover system includes a first support member extending vertically from the frame member. The first support member has a first portion attached to the frame member and a second portion spaced apart from the first portion. The cabin cover system includes a canopy pivotally coupled to the second portion of the first support member. The cabin cover system also includes at least one hydraulic actuator operatively coupled to each of the canopy and the frame member. The at least one hydraulic actuator is configured to pivotally move the canopy towards the material carriage.

In yet another aspect of the present disclosure, a cabin cover system for a machine is disclosed. The cabin cover system is positioned over an operator cabin of the machine. The cabin cover system includes a first support member extending vertically from a frame member of the machine. The first support member has a first portion attached to the frame member and a second portion spaced apart from the first portion. The cabin cover system further includes a canopy pivotally coupled to the second portion of the first support member. The cabin cover system also includes at least one hydraulic actuator operatively coupled to each of the canopy and the frame member. The at least one hydraulic actuator is configured to pivotally move the canopy towards the truck body.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
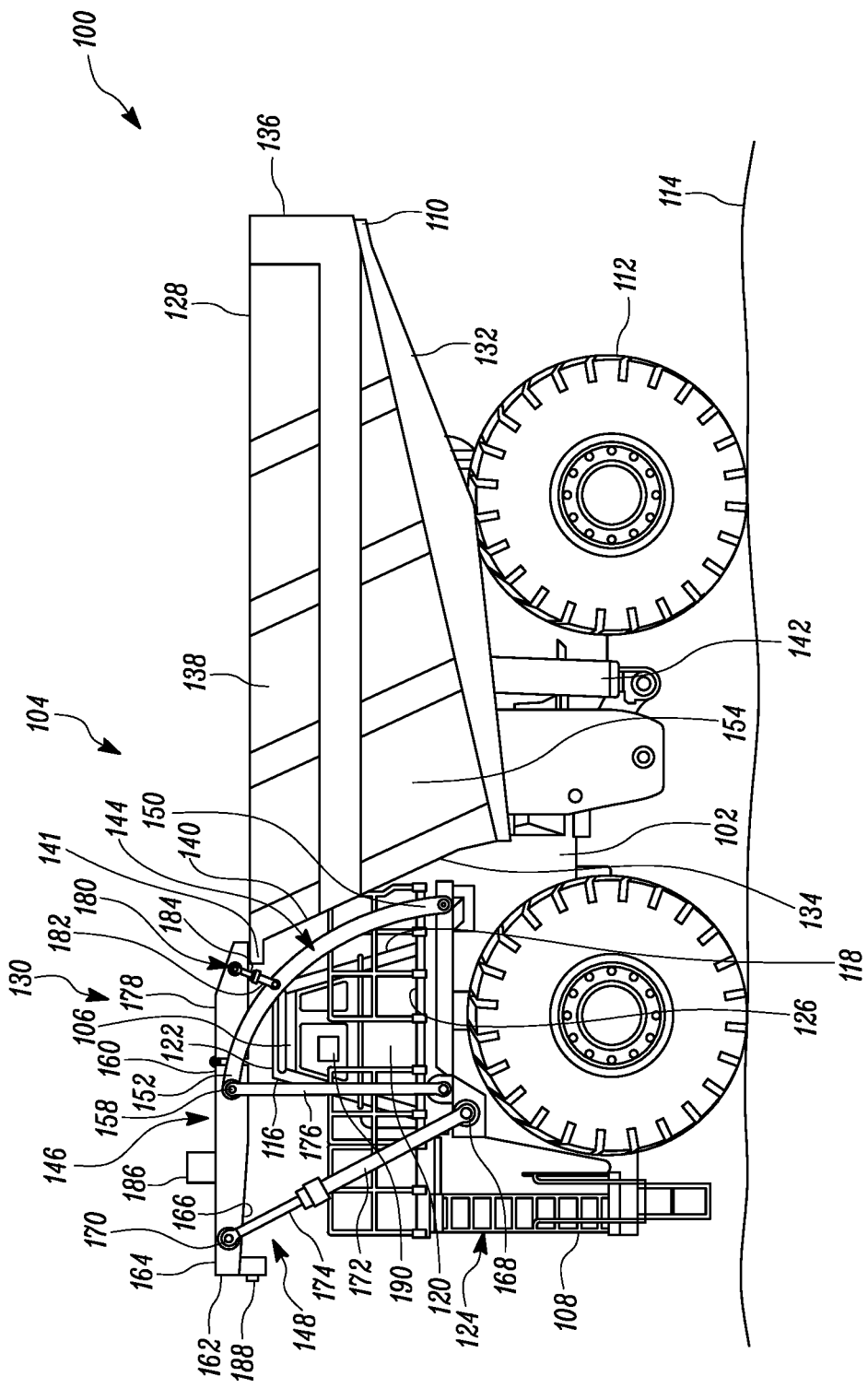
FIG. 1 is a side view of a machine having a truck body and a cabin cover system, according to an embodiment of the present disclosure.

FIG. 1 illustrates a side view of a machine 100, according to an embodiment of the present disclosure. The machine 100 may be used in various industries, such as construction, mining and any other known industries for transporting material from one location to another location. The machine 100 includes a frame member 102 for supporting various components of the machine 100 including, but not limited to, a truck body 104 and an operator cabin 106. The frame member 102 has a first end 108 and a second end 110 for the machine 100. The machine 100 may further include an engine (not shown) for propelling the machine 100.

The machine 100 further includes a plurality of ground engaging members 112 supported from the frame member 102 to drive the machine 100 over a ground surface 114. In an embodiment, the ground engaging members 112 may be configured to receive power from the engine via a transmission system (not shown). The transmission system may provide various speeds and torques to the ground engaging members 112. In another embodiment, the engine may be coupled to a generator (not shown) to electrically drive the ground engaging members 112 via one or more electric motors.

The operator cabin 106 is disposed adjacent to the first end 108 of the frame member 102, as illustrated in FIG. 1. The operator cabin 106 has a front wall 116, a rear wall 118, a pair of lateral walls 120, and a top cover 122 together define a chamber for the operator cabin 106. The operator cabin 106 accommodates an operator to control operations of the machine 100. The operator cabin 106 may include various control equipment including, but not limited to, one or more levers, pedals, and a display unit for controlling the machine 100 in response to inputs from the operator. The machine 100 further includes a stairway 124 and a platform 126. The stairway 124 may extend from the platform 126, providing access to the platform 126 and/or the operator cabin 106.

The truck body 104 is disposed behind the operator cabin 106. The truck body 104 includes a material carriage 128 and a cabin cover system 130. The material carriage 128 of the truck body 104 is configured to contain a payload of a material. The material carriage 128 includes a bottom wall 132 defining a front end 134 and a rear end 136 for the material carriage 128. The bottom wall 132 further defines a width of the material carriage 128. The material carriage 128 further includes a pair of lateral walls 138 extending from the bottom wall 132. The pair of lateral walls 138 includes a first side wall 138A and a second side wall 138B (shown in FIG. 2). The material carriage 128 further includes a front wall 140 extending from the bottom wall 132 adjacent to the front end 134. The front wall 140 further extends between the first and second side walls 138A, 138B. The front wall 140 and each of the first and second side walls 138A, 138B together define a height for the material carriage 128 with respect to the bottom wall 132. Further, the front wall 140 of the material carriage 104 includes a lip 141 projecting out toward the front end 108 of the frame member 102, at a top end of the front wall 140. The material carriage 128 is pivotally disposed on the frame member 102. One or more hydraulic cylinders 142 are operatively coupled to the material carriage 128 in order to enable a pivotal movement of the material carriage 128 with respect to the frame member 102 to load and unload the material. The hydraulic cylinders 142 may be fluidly connected to a hydraulic system of the machine 100 and actuated by one or more control levers (not shown) disposed in the operator cabin 106.

Figure 2:
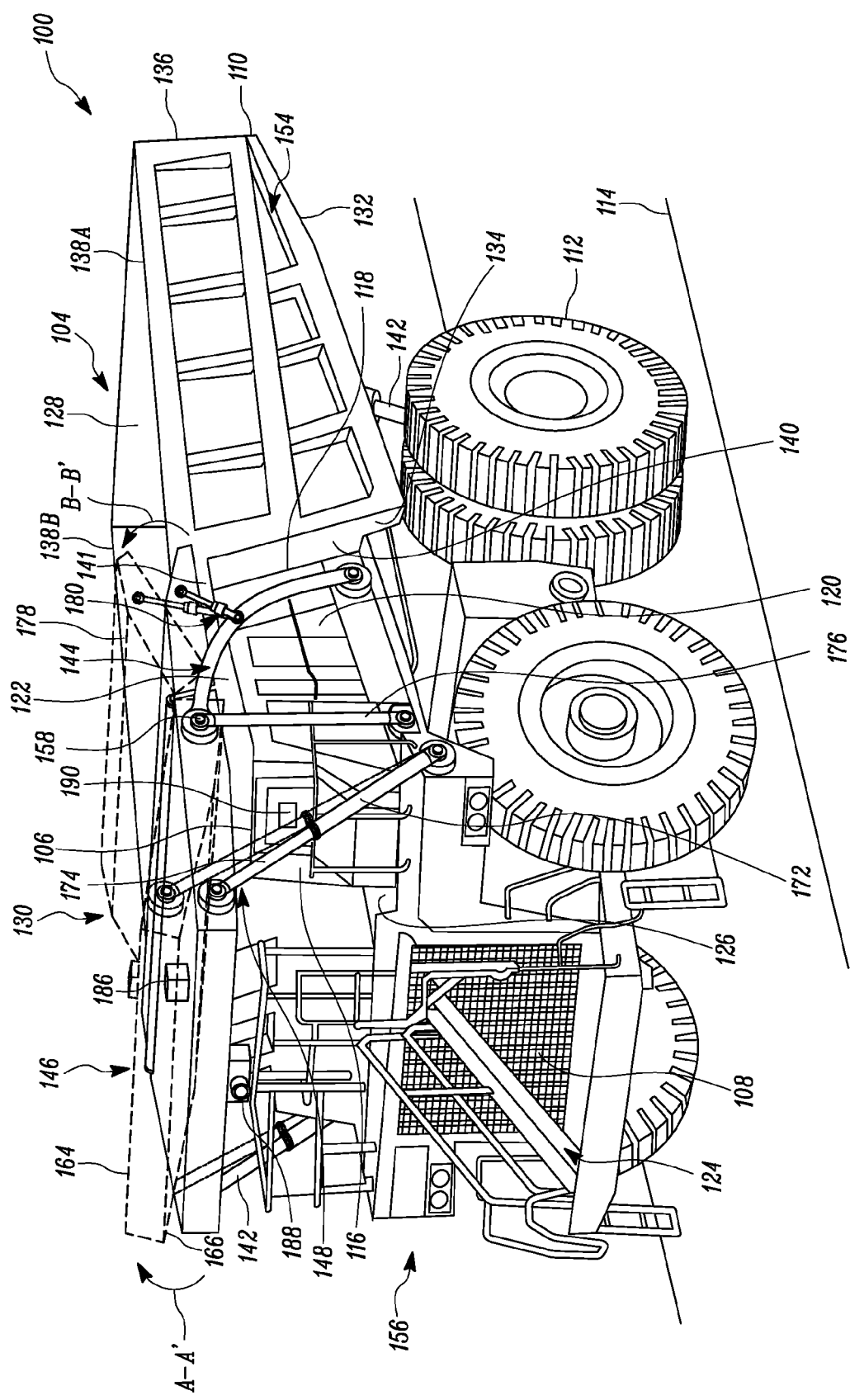
FIG. 2 is a front perspective view of the machine having the cabin cover system of FIG. 1, according to the embodiment of the present disclosure.

The cabin cover system 130 is positioned over the operator cabin 106. Referring to FIG. 1 and FIG. 2, the cabin cover system 130 includes a first support member 144, a canopy 146 and at least one hydraulic actuator 148. The first support member 144 is located between the rear wall 118 of the operator cabin 106 and the front wall 140 of the material carriage 128. The first support member 144 extends vertically from the frame member 102. The first support member 144 has a first portion 150 and a second portion 152. The first portion 150 is attached to the frame member 102 of the machine 100. In one embodiment, the first portion 150 is welded to the frame member 102. In another embodiment, the first portion 150 may be pivotally coupled to the frame member 102 of the machine 100. The second portion 152 is spaced apart from the first portion 150. A distance between the first portion 150 and the second portion 152 defines a length of the first support member 144. In one embodiment, the cabin cover system 130 may include at least two first support members, identical to the first support member 144. The at least two first support members are disposed at each of a first side 154 and a second side 156 (shown in FIG. 2) of the frame member 102. In one embodiment, the first support member 144 has a curved profile. In another embodiment, the first support member 144 can have a rectangular profile.

The second portion 152 of the first support member 144 is configured to accommodate a pivot shaft 158. The pivot shaft 158 extends throughout a width of the frame member 102. The canopy 146 of the cabin cover system 130 is pivotally coupled to the pivot shaft 158 present at the second portion 152 of the first support member 144. The canopy 146 is a large flat member extending from a first end 160 and a second end 162 above the top cover 122 of the operator cabin 106. The first end 160 is configured to pivotally couple to the second portion 152 of the first support member 144. The canopy 146 covers the operator cabin 106 of the machine 100. The canopy 146 has a top surface 164 and a bottom surface 166 opposite to the top surface 164. The distance between the top surface 164 and the bottom surface 166 defines a thickness of the canopy 146. The canopy 146 is configured to move in a direction A-A' with respect to the frame member 102. More specifically, the canopy 146 may be tilted in the direction A-A' towards the material carriage 128 for removing material received on the top surface 164 of the canopy 146 due to the overflow of material from the material carriage 128 as illustrated in FIG. 2.

The hydraulic actuator 148 is operatively coupled to the each of the frame member 102 and the canopy 146 as illustrated in FIG. 1. In one embodiment, the hydraulic actuator 148 is located proximal to the first end 108 of the frame member 102. The hydraulic actuator 148 has a bottom end 168 and a top end 170. The bottom end 168 of the hydraulic actuator 148 is pivotally coupled to the of the frame member 102. The top end 170 of the hydraulic actuator 148 is coupled to the second end 162 of the canopy 146.

The hydraulic actuator 148 is embodied as double acting hydraulic cylinders. The hydraulic actuator 148 includes a cylindrical housing 172 located at the bottom end 168 of the hydraulic actuator 148. The hydraulic actuator 148 includes a piston 174 located at the top end 170 of the hydraulic actuator 148. The cylindrical housing 172 has an inner surface (not numbered) defining a hollow cavity and the piston 174 may be adapted to slide on the inner surface within the cavity. The piston 174 is sized and shaped to fit closely against the inner surface of the cylindrical housing 172. The piston 174 may divide the hollow cavity within the cylindrical housing 172 into a first chamber and a second chamber (not shown). Further, the cylindrical housing 172 may be provided with a head end port (not shown) associated with the first chamber and a rod end port (not shown) associated with the second chamber. Pressurized hydraulic fluid may flow into and out of the first and second chambers, through their respective ports to create a pressure differential between them, and that may cause movement of the piston 174. The piston 174 is attached to the canopy 146 (shown in FIGS. 1 and 2). Therefore, the hydraulic actuator 148 moves the canopy 146 with respect to the frame member 102 along the direction A-A' as shown in FIG. 2. In one embodiment, the cabin cover system 130 may include two hydraulic actuators, identical to the hydraulic actuator 148, located at each of the first side 154 and the second side 156 (shown in FIG. 2) of the frame member 102. The hydraulic actuator 148 may be fluidly connected to a hydraulic system of the machine 100 and actuated by one or more control levers disposed in the operator cabin 106.

Referring to FIGS. 1 and 2, the canopy 146 is further supported by a second support member 176. The second support member 176 may be an elongated rod, extending from the frame member 102. In one embodiment, the second support member 176 includes at least two elongated rods disposed at each of the first side 154 and the second side 156 of the frame member 102. The second support member 176 is pivotally connected to the first end 160 of the canopy 146. In one embodiment, the second support member 176 may be welded to each of the frame member 102 and the canopy 146. In another embodiment, the second support member 176 may be removably coupled to each of the frame member 102 and the canopy 146. The second support member 176 cantilevers the canopy 146 for providing an additional support to the canopy 146.

The cabin cover system 130 also includes a cover panel 178. The cover panel 178 is located between the material carriage 128 and the canopy 146. The cover panel 178 is a flat plate extending throughout the width of the frame member 102. The cover panel 178 extends over the lip 141 of the material carriage 128, so that the cover panel 178 covers the gap between the canopy 146 and the material carriage 128. The cover panel 178 is pivotally coupled to the first support member 144 to selectively close a gap between the material carriage 128 and the canopy 146. In one embodiment, the cover panel 178 is positioned adjacent to the second portion 152 of the first support member 144. In one embodiment, the cover panel 178 may be tilted based on a pivotal movement the canopy 146 in the direction A-A'. In another embodiment, the cover panel 178 is tilted based on a movement of the material carriage 128 during loading and unloading of the material. More specifically, during the movement of the material carriage 178, the lip 141 come in contact with the cover panel 178 and tilts the cover panel 178 at the direction A-A'.

The cover panel 178 is pivotally coupled to the first support member 144 via at least one tilt actuator 180. In one embodiment, the cabin cover system 130 includes at least two tilt actuators connected to each of the first side 154 and the second side 156 of the frame member 102. The at least two tilt actuators are configured to selectively tilt the cover panel 178.

The tilt actuator 180 is embodied as a double acting hydraulic cylinder. The tilt actuator 180 includes a cylindrical housing 182 and a piston 184. The cylindrical housing 182 of the tilt actuator 180 has an inner surface (not numbered) defining a hollow cavity and the piston 184 may be adapted to slide on the inner surface within the cavity. The piston 184 is sized and shaped to fit closely against the inner surface of the cylindrical housing 182. The piston 184 may divide the hollow cavity within the cylindrical housing 182 into a first chamber and a second chamber (not shown). Further, the cylindrical housing 182 may be provided with a head end port (not shown) associated with the first chamber and a rod end port (not shown) associated with the second chamber. Pressurized hydraulic fluid may flow into and out of the first and second chambers, through their respective ports to create a pressure differential between them, and that may cause movement of the piston 184. The piston 174 is attached to the cover panel 178 (shown in FIGS. 1 and 2). Therefore, the tilt actuator 180 selectively tilts the cover panel 178.

In one embodiment, the tilt actuator 180 is configured to pivotally move the cover panel 178 with respect to the pivotal movement of the material carriage 128. More specifically, the tilt actuator 180 moves the cover panel 178 in a direction B-B' based on at least one of an upward and a downward movement of the material carriage 128. In another embodiment, the tilt actuator 180 is configured to pivotally move the cover panel 178 with respect to the movement of the canopy 146. For example, when the canopy 146 is moved in the direction A-A', the cover panel 178 is tilted using the tilt actuator 180 to direct the material present at the top surface 164 of the canopy 146 to the material carriage 128.

In one embodiment, the tilt actuator 180 is configured to enable a tilt movement of the cover panel 178 based on the movement of at least one of the material carriage 128 and the canopy 146. In another embodiment, the tilt actuator 180 may be fluidly connected to the hydraulic system of the machine 100. In such a scenario, the tilt actuator 180 may be actuated by an operator using one or more control levers disposed in the operator cabin 106.

The cabin cover system 130 further comprises at least one sensor 186. The sensor 186 may be a mass measuring sensor. In one embodiment, the sensor 186 is connected to the canopy 146. The sensor 186 is configured to detect a presence of material on the top surface 164 of the canopy 146. In order to determine the presence of material on the top surface 164 of the canopy 146, firstly, a weight of the canopy 146 is determined. Secondly, the determined weight of the canopy 146 is set as a reference value. The sensor 186 measures the weight of the canopy 146. Any weight measured by the sensor 186 above a predetermined weight of the canopy 146 may indicate the presence of material on the top surface 164 of the canopy 146. The sensor 186 is further configured to generate an input signal indicative of the presence of material on the top surface 164 of the canopy 146. For example, the predetermined weight of the canopy 146 above which the sensor generates the input signal may be depends up on factors such as size of the machine.

The cabin cover system 130 further includes a controller 190. The controller 190 is in communication with at least one of the sensor 186, the hydraulic actuator 148, and the tilt actuator 180. The controller 190 is configured to receive the signal from the sensor 186. Based on the signal received from the sensor 186, the controller 190 determines whether the material is present on the top surface 164 of the canopy 146. In an example, the controller 190 may be a processor including a single processing unit or a number of processing units, all of which may include a plurality of computing units. The explicit use of the term 'processor' should not be construed to refer exclusively to hardware capable of executing a software application. Rather, in this example, the controller 190 may be implemented as one or more microprocessors, microcomputers, digital signal processor, central processing units, logic circuitries, and any device that is capable of manipulating signals based on operational instructions. The controller 190 further actuates at least one indicating device (not shown) to indicate the presence of material on the top surface 164 of the canopy 146 to an operator based on the input signal. Further, the controller 190 actuates the hydraulic actuator 148 to move the canopy 146 towards the material carriage 128, at the direction A-A' for removing material present on the top surface 164 of the canopy 146. Also, the controller 190 actuates the tilt actuator 180 for selectively tilting the cover panel 178. In another embodiment, the operator can operate the hydraulic actuator 148 using any of the one or more control levers disposed in the operator cabin 106 upon receiving an indication from the indicating device regarding the presence of material on the top surface 164 of the canopy 146.

A camera 188 may be disposed on the machine 100. The first support member 144 and the second support member 176 of the cabin cover system 130 limits the visibility of the operator. Hence, the camera 188 is positioned at various locations of the machine 100 for improving the visibility of the operator.

Figure 3:
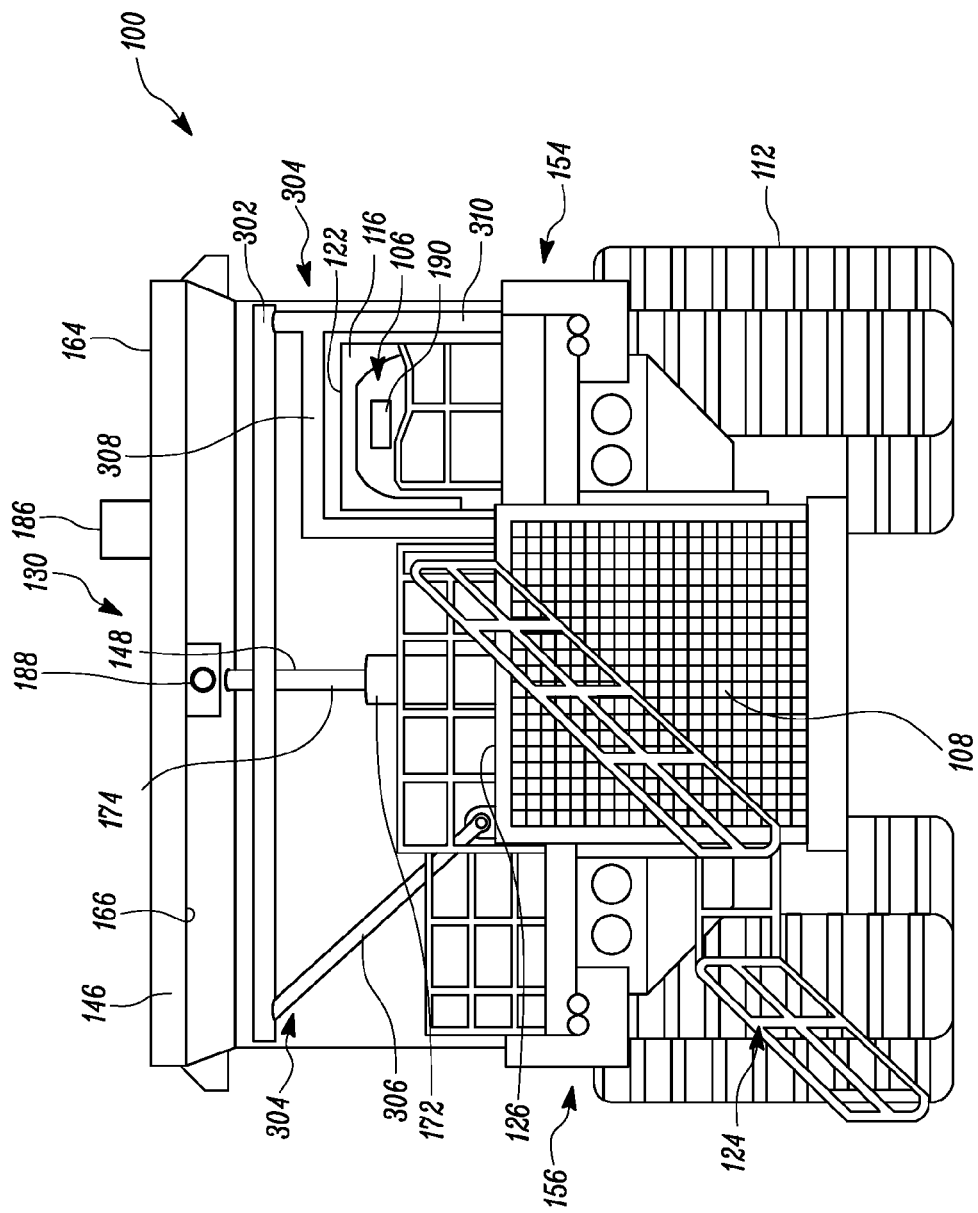
FIG. 3 is a front view of the machine having the cabin cover system, according to another embodiment of the present disclosure.

FIG. 3 illustrates a front view of the machine 100 having the cabin cover system 130, according to another embodiment of present disclosure. The cabin cover system 130 includes the first support member 144, the canopy 146 and the hydraulic actuator 148. As illustrated in FIG. 3, the hydraulic actuator 148 of the cabin cover system 130 is positioned at the first end 108 of the frame member 102. The present embodiment further includes the sensor 186, the cameras 188 and the controller 190. For the sake of brevity, the aspects of the present disclosure which are already explained in detail in the description of FIG. 1 and FIG. 2 are not explained in detail with regard to the description of the FIG. 3.

Referring to FIG. 3, the cabin cover system 130 includes a pivot support member 302 disposed at the first end 108 of the frame member 102. The pivot support member 302 is configured to support the canopy 146. Multiple reinforcement members 304 are attached to the pivot support member 302. The reinforcement members 304 are provided for an additional support to the pivot support member 302. The reinforcement members 304 include, but are not limited to, a first reinforcement member 306 and the second reinforcement member 308. The first reinforcement member 306 may a tube extending from the frame member 102 and connected to the pivot support member 302. In one embodiment, the first reinforcement member 306 may be inclined at an angle with respect to the frame member 102 as illustrated in FIG. 3. In another embodiment, the first reinforcement member 306 may extend vertically from the frame member 102. In the illustrated example, the first reinforcement member 306 is located proximal to the second side 156 of the frame member 102.

The second reinforcement member 308 includes multiple support tubes. The second reinforcement member 308 is disposed proximal to the first side 154 of the frame member 102. In the illustrated example, a set of multiple support tubes forms a box structure around the operator cabin 106. The box structure provides protection to the operator cabin 106 without limiting the visibility of the operator. The box structure is attached to a vertical upright 310 extending from the frame member 102 and attached to the pivot support member 302. The vertical upright 310 is configured to support the pivot support member 302.

INDUSTRIAL APPLICABILITY

The present disclosure relates to the cabin cover system 130 for the machine 100. The cabin cover system 130 includes the first support member 144 cantilevering the canopy 146. Further, the canopy 146 is pivoted at the direction A-A' using the hydraulic actuator 148. The cabin cover system 130 also includes the sensor 186 and the controller 190. The controller 190 actuates the hydraulic actuator 148 for titling the canopy 146 based on the inputs signal received from the sensor 186 The controller 190 is also configured to actuate the tilt actuator 180 to title the cover panel 178.

The cabin cover system 130, according to present disclosure, separates the canopy 146 from the material carriage 128 of the machine 100 by providing the first support member 144, the second support member 176, and the hydraulic actuators 148 for supporting the canopy 146. The separation of the canopy 146 from the material carriage 128 reduces an overall weight of the material carriage 128, thereby increasing the performance of the hydraulic system used to lift the material carriage 128. Hence, the payload which can be loaded and unloaded by the material carriage 128 increases. The canopy 146 is coupled behind the operator cabin 106 and in front of the material carriage 128. The hydraulic actuator 148 of the cabin cover system 130 enables the pivoted movement of the canopy 146 to remove any overflow of material on the top surface 164 of the canopy 146.

The cabin cover system 130 further includes the cover panel 178 to prevent material from falling between the canopy 146 and the material carriage 128. The cover panel 178 is tilted using the tilt actuator 180 when the material carriage 128 is tilted up to unload the material. Further, the cover panel 178 is independently pivoted to direct material from the canopy 146 into the material carriage 128, when the canopy 146 is pivoted at the direction A-A'. Similarly, the cover panel 178 selectively closes the gap between the material carriage 128 and the canopy 146 once the material carriage 128 is at a horizontal rest position.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine comprising:
   a frame member;
   a truck body disposed on the frame member;
   an operator cabin disposed on the frame member adjacent to the truck body; and
   a cabin cover system positioned over the operator cabin, the cabin cover system comprising:
   a first support member extending vertically from the frame member, the first support member having a first portion attached to the frame member and a second portion spaced apart from the first portion;
   a canopy pivotally coupled to the second portion of the first support member;
   at least one hydraulic actuator operatively coupled to each of the canopy and the frame member, wherein the at least one hydraulic actuator is configured to pivotally move the canopy towards the truck body; and
   a cover panel pivotally coupled to the first support member to selectively close a gap between the truck body and the canopy.

2. The machine of claim 1, wherein the cabin cover system further comprises at least one tilt actuator operatively coupled to the cover panel to selectively tilt the cover panel based on a movement of the canopy towards the truck body.

3. The machine of claim 1, wherein the cabin cover system comprises a second support member extending from the frame member, the second support member is pivotally coupled to the canopy.

4. The machine of claim 1, wherein the cabin cover system further comprises at least one sensor, the sensor is configured to:

detect a presence of material on a top surface of the canopy based on a predetermined weight of the canopy; and generate an input signal indicative of the presence of material on the top surface of the canopy.

5. The machine of claim 4, wherein the cabin cover system further comprises a controller in communication with the sensor and the at least one hydraulic actuator, wherein the controller is configured to:

receive the input signal from the sensor;

indicate the presence of material on the top surface of the canopy to an operator based on the input signal; and actuate the at least one hydraulic actuator to move the canopy towards the truck body for removing material present on the top surface of the canopy based on the input signal.

6. A truck body for a machine having a frame member and an operator cabin, the truck body comprising:

a material carriage pivotally coupled on the frame member of the machine; and a cabin cover system positioned over the operator cabin, the cabin cover system comprising:

a first support member extending vertically from the frame member, the first support member having a first portion attached to the frame member and a second portion spaced apart from the first portion;

a canopy pivotally coupled to the second portion of the first support member; and at least one hydraulic actuator operatively coupled to each of the canopy and the frame member, wherein the at least one hydraulic actuator is configured to pivotally move the canopy towards the material carriage.

7. The truck body of claim 6, wherein the cabin cover system further comprises a cover panel pivotally coupled to the first support member to selectively close a gap between the material carriage and the canopy.

8. The truck body of claim 7, wherein the cabin cover system further comprises at least one tilt actuator operatively coupled to the cover panel to selectively tilt the cover panel with respect to the first support member based on a movement of the canopy towards the material carriage.

9. The truck body of claim 6, wherein the cabin cover system comprises a second support member extending from the frame member, the second support member is pivotally coupled to the canopy.

10. The truck body of claim 6, wherein the cabin cover system further comprises at least one sensor, the sensor is configured to:

detect a presence of material on a top surface of the canopy based on a predetermined weight of the canopy; and generate an input signal indicative of the presence of material on the top surface of the canopy.

11. The machine of claim 10, wherein the cabin cover system further comprises a controller in communication with the sensor and the at least one hydraulic actuator, wherein the controller is configured to:

receive an input signal from the sensor;

indicate the presence of material on the top surface of the canopy to an operator cabin based on the input signal; and actuate the at least one hydraulic actuator to move the canopy towards the material carriage for removing material present on the top surface of the canopy.

12. A cabin cover system for a machine having a frame member, a truck body and an operator cabin, the cabin cover system comprising:

a first support member extending vertically from the frame member, the first support member having a first portion attached to the frame member and a second portion spaced apart from the first portion;

a canopy pivotally coupled to the second portion of the first support member; and at least one hydraulic actuator operatively coupled to each of the canopy and the frame member, wherein the at least one hydraulic actuator is configured to pivotally move the canopy towards the truck body.

13. The cabin cover system of claim 12 further comprises a cover panel pivotally coupled to the first support member to selectively close a gap between the truck body and the canopy.

14. The cabin cover system of claim 13 further comprises at least one tilt actuator operatively coupled to the cover panel to selectively tilt the cover panel with respect to the first support member based on a movement of the canopy towards the truck body.

15. The cabin cover system of claim 12 further comprises a second support member extending from the frame member, the second support member is pivotally coupled to the canopy.

16. The cabin cover system of claim 12 further comprises at least one sensor, the sensor is configured to:

detect a presence of material on a top surface of the canopy based on a predetermined weight of the canopy; and generate an input signal indicative of the presence of material on the top surface of the canopy.

17. The cabin cover system of claim 16, wherein the cabin cover system further comprises a controller in communication with the sensor and the at least one hydraulic actuator, wherein the controller is configured to:

receive the input signal from the sensor;

indicate the presence of material on the top surface of the canopy to an operator based on the input signal; and actuate the at least one hydraulic actuator to move the canopy towards the truck body for removing material present on the top surface of the truck body.

* * * * *